United States Patent [19]
Sundquist et al.

[11] 3,843,245
[45] Oct. 22, 1974

[54] CARD HANDLING MECHANISM

[75] Inventors: John L. Sundquist, Roseville; Lloyd W. Martin, Minneapolis, both of Minn.

[73] Assignee: Minnesota Mining and Manufacturing Company, St. Paul, Minn.

[22] Filed: Jan. 12, 1972

[21] Appl. No.: 217,312

[52] U.S. Cl. ................................. 353/27, 353/95
[51] Int. Cl. ...................... G03b 23/08, G03b 1/48
[58] Field of Search .............................. 353/25–27, 353/95; 40/78.05; 340/172.5

[56] References Cited
UNITED STATES PATENTS

| | | | |
|---|---|---|---|
| 3,323,373 | 6/1967 | Murray | 353/27 |
| 3,405,996 | 10/1968 | Novak | 353/27 |
| 3,556,651 | 1/1971 | Lavander | 353/26 |
| 3,645,612 | 2/1972 | Streicher | 353/27 |

Primary Examiner—Louis R. Prince
Assistant Examiner—A. J. Mirabito
Attorney, Agent, or Firm—Alexander, Sell Steldt & Delahunt

[57] ABSTRACT

A microfilm aperture card handling mechanism which feeds an aperture card from a pack of aperture cards to an optical projection station and uniformly moves the microfilm in the card at right angles through the light path of the projection station to scan the image on the microfilm. The aperture card is supported on a platen at the projection station by a clamping means affording manual removal or replacement of the aperture card.

6 Claims, 6 Drawing Figures

CARD HANDLING MECHANISM

BACKGROUND OF THE INVENTION

This invention relates to microfilm aperture card handling mechanisms of the type disclosed in U.S. Pat. Nos. 3,180,367 and 3,556,651 which feed single aperture cards seriatim from a pack of aperture cards to an optical projection station, afford scanning of the microfilm in an aperture card by the light path in the projection station, and drive the scanned card from the projection station.

SUMMARY OF THE INVENTION

The improved and simplified mechanical card handling mechanism of the present invention performs these functions while affording manual inspection, removal, or replacement of an aperture card at the optical projection station.

According to the present invention there is provided a mechanism for handling microfilm aperture cards in a microfilm print-out machine requiring scan exposure of the microfilm by moving it at a predetermined rate through the light path of an optical projection station. The mechanism includes a platen with a supporting surface driven between a first and second position with the supporting surface at right angles to the light path. Feeding means dispense aperture cards seriatim to the supporting surface, where they are properly positioned by the mechanism, and a movable clamping plate then clamps the aperture card to the platen during scanning of the microfilm. In the present invention the clamping plate may be released independent of the means for operating the clamping plate during feeding of cards by the feeding means, thereby affording insertion or substitution of a microfilm card on the platen.

BRIEF DESCRIPTION OF THE DRAWING

The invention will be further described with reference to the accompanying drawings wherein like numbers refer to like parts in the several views, and wherein.

DESCRIPTION OF THE PREFERRED EMBODIMENT

Figure 1:
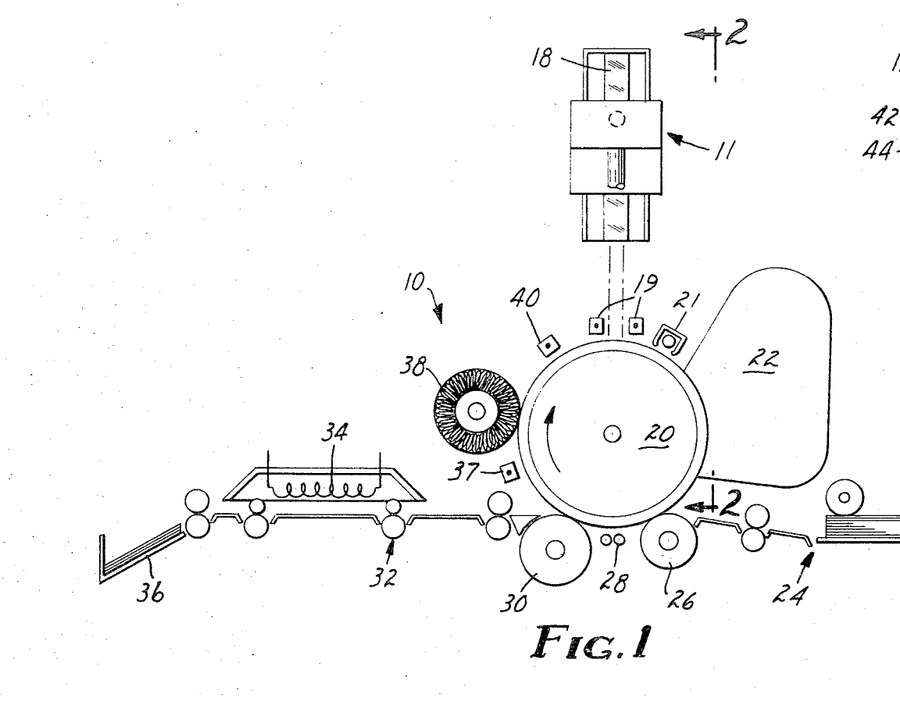
FIG. 1 is a schematic view of a microfilm printout machine to produce an enlarged copy of the microfilm image including a card handling mechanism according to the present invention.
Figure 2:
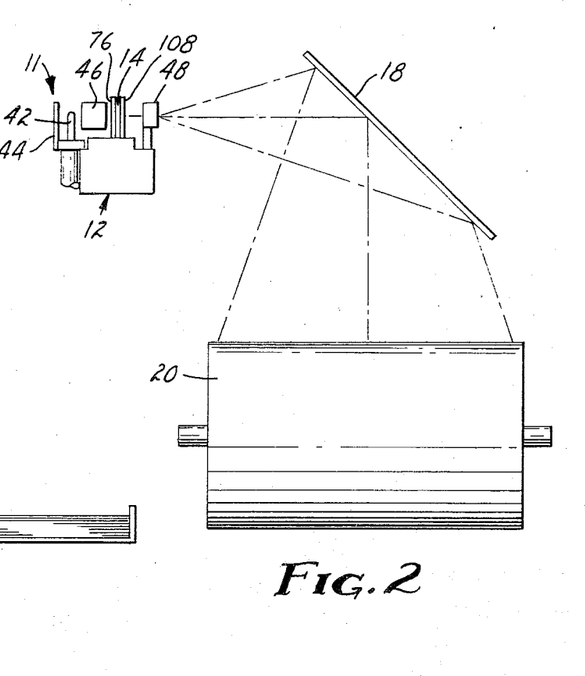
FIG. 2 is a schematic view taken approximately along line 2—2 of FIG. 1.

Referring now to FIGS. 1 and 2, there is schematically shown a microfilm print-out machine 10 for producing an enlarged print of a microfilm image. The machine 10 has an optical projection station 11 and a microfilm aperture card handling mechanism 12 according to the present invention. The card handling mechanism 12 affords either manual positioning of a microfilm aperture card 14 at the projection station 11 or automatic feeding of single microfilm aperture cards 14 seriatim from a pack of aperture cards to the projection station 11. The card handling mechanism 12 provides movement of a card 14 positioned at the projection station 11 at right angles through the light path thereof to afford scanning of the microfilm carried by the aperture card 14 and printing of the graphic information thereon by a printing mechanism of the machine 10 which may be of the type described in the aforementioned patents, or use the process described in U.S. Pat. No. 3,457,070.

Briefly in a printing mechanism using the process described in U.S. Pat. No. 3,457,070 an image projected during movement of a microfilm through the projection station 11 is reflected via a mirror 18 onto a photosensitive means about the periphery of a rotating drum 20 including a transparent nonconductive sheet over a sensitized precharged photosensitive layer supported on a conductive backing. The image strikes the photosensitive means in the presence of a negative corona discharge from a source 19, causing imagewise charges opposite the initial charges in the photosensitive layer. The photosensitive means then moves sequentially past a source of light 21 to increase the contrast in the latent image, past a coater 22 which exposes the photosensitive means to particles which are selectively attracted thereto, and into contact with a receptor sheet fed from a sheet feeding device 24 at a nip between the drum 20 and a roller 26. The drum 20 carries the sheet past a source of corona discharge 28 to transfer the particulate image to the sheet, and to a vacuum roll 30 which separates the sheet from the drum 20 and feeds it along a conveyor 32. The conveyor 32 carries the sheet to a receiving tray 36 past a heater 34 for fusing the particulate image onto the sheet. The photosensitive means passes a cleaning corona source 37 and a cleaning brush 38, and is then again uniformly charged by a positive corona source 40.

Figure 3:
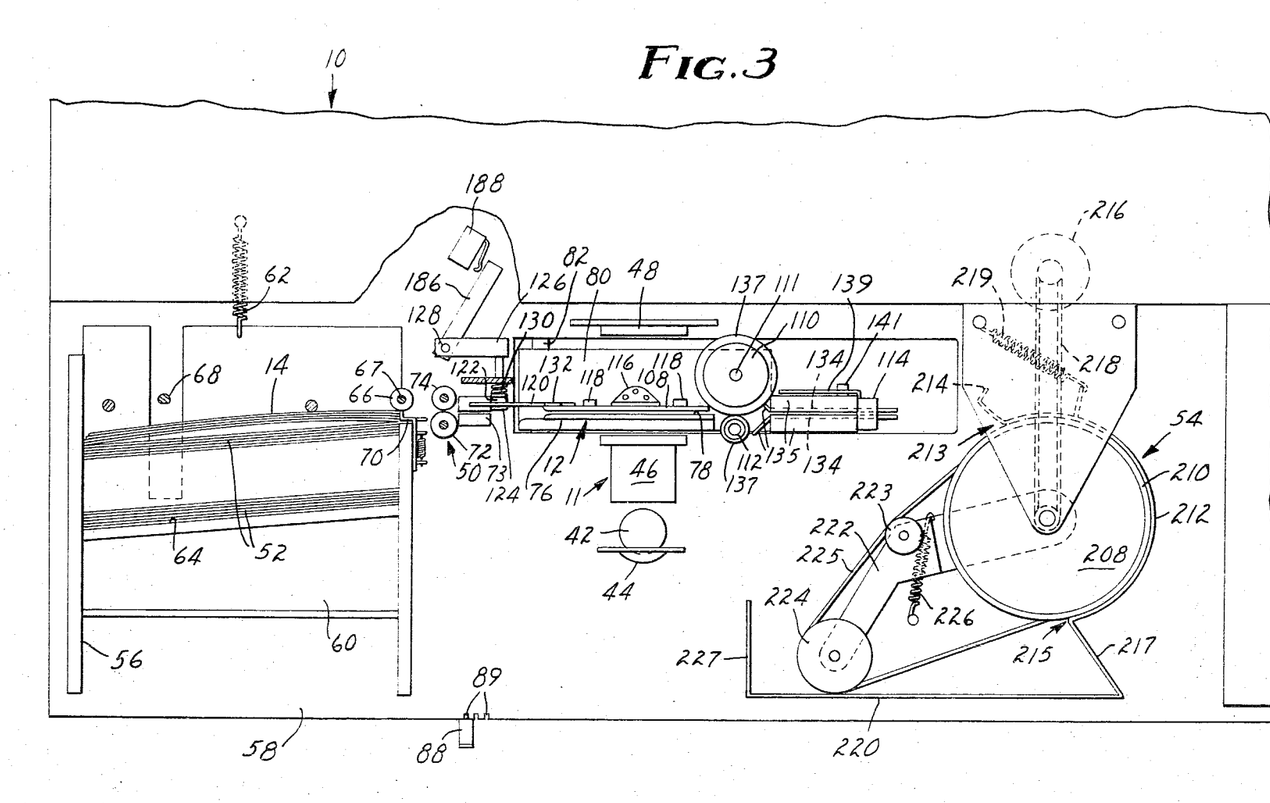
FIG. 3 is a plan view of the card handling mechanism of the machine, with parts broken away to show details.
Figure 4:
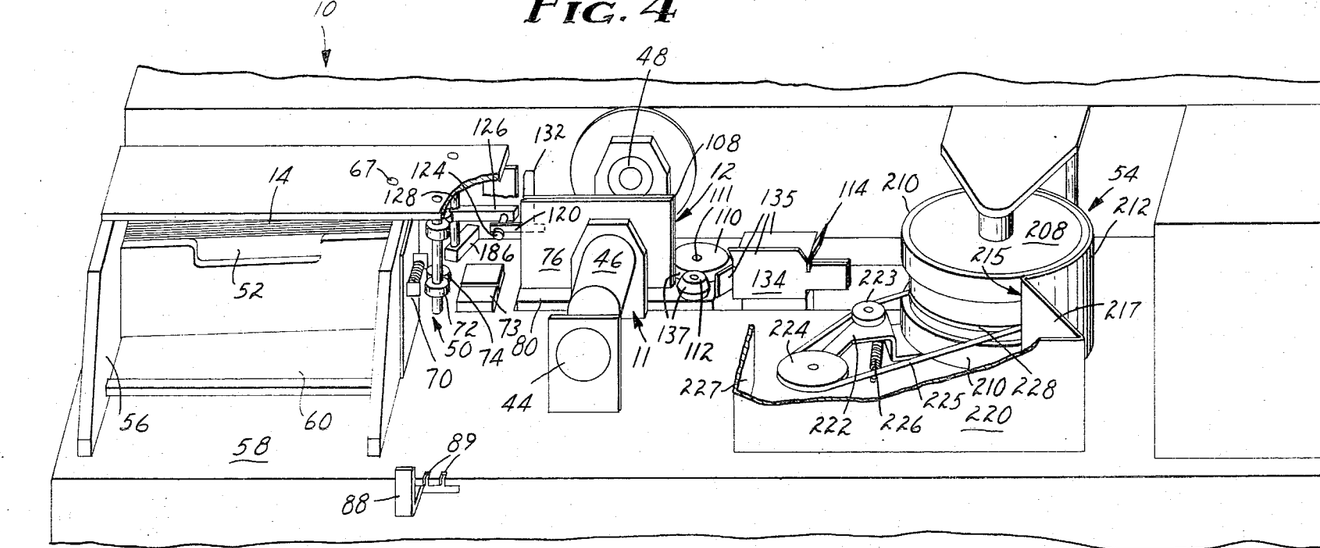
FIG. 4 is a perspective view of the card handling mechanism showing the top, front and right side with portions broken away to show interior members.

The microfilm aperture card handling mechanism 12 of the present invention is illustrated in FIGS. 3 and 4 with the optical projection station 11 of the machine 10. The projection station 11 comprises a lamp 42, a reflector 44, and a first condensing lens system 46 for directing light along a path through a focal plane (across which a microfilm may be moved at right angles to the light path) to a projection lens system 48 affording projection of the graphic intelligence on the microfilm. The aperture card handling mechanism 12 includes feeding means generally designated by the numeral 50 for feeding single aperture cards 14 seriatim along a predetermined path to the optical projection station 11 from a pack 52 of aperture cards, means along the path adapted for engaging an aperture card positioned at the projection station 11 either manually or by the feeding means, and for moving the microfilm carried by the aperture card 14 at right angles through the light path in the projection station 11. The aperture card handling mechanism 12 also includes ejection means to eject aperture cards 14 from the projection station 11 after the microfilm has been moved through the light path a predetermined number of times, and stacking means generally designated by the numeral 54 for receiving and stacking the microfilm aperture card 14 ejected from the optical projection station 11.

The feeding means 50 for feeding aperture cards 14 seriatim to the projection station 11 includes aperture card storage means comprising a rectangular opening 56 defined in a frame 58 for the card handling mechanism 12 and machine 10. The opening 56 is sized to provide a slight clearance about the periphery of an aperture card 14 vertically disposed. A follower 60 biased by a spring 62 is slidably mounted on the frame 58 and has a surface 64 oriented to urge an end of the pack 52 of aperture cards 14 in the opening 56 into engagement with a drive roller 66 on a shaft 67 rotatably mounted on the frame 58, while affording little or no pressure on the aperture card pack 52 against a locating pin 68 mounted on the frame 58. When an aperture card 14 is to be driven from the pack 52, a drive means, later to be explained, is activated to rotate the drive roller 66 and slide the adjacent aperture card 14 longitudinally across the face of the pack 52 between an edge on a gate member 70 adjustably mounted on the frame 58 and spaced from the drive roller 66 to allow movement of only one aperture card 14 from the pack 52. The drive roller 66 feeds the separated aperture card 14 between an idler roller 74 and a roller 72 also driven by the drive means, through a slotted guide block 73 and to the projection station 11.

The means adapted for engaging an aperture card 14 positioned at the projection station 11 and for moving the microfilm carried by the aperture card 14 at right angles through the light path includes a transparent platen 76 having a support surface 78 and being mounted on the frame 58 for movement parallel to the support surface 78 between a first and a second position. The support surface 78 of the platen 76 is aligned with to the path along which an aperture card is fed by the feeding means 50, and is oriented at right angles to and passes through the light path. Positioning means (to be explained later) positions an aperture card 14 fed by the feeding mechanism 50 at a predetermined position on the platen 76. The distance of movement between the first and second position of the platen 76 is adaptable to correspond to the width of information on the microfilm carried by the aperture card 14 to afford a scanning traversing of the microfilm by the light path upon movement of the platen 76 from the first to the second position.

The transparent platen 76 is mounted on a carriage 80 mounted for linear movement on the frame 58. The carriage 80 includes three bearing members 82 (FIG. 5) slidably mounted on a pair of parallel rods 84 attached to the frame 58. The rods 84 are positiond to afford movement of the platen 76 in a plane parallel to the supporting surface 78 at a right angle through the light path of the projection station 11 between the first position of the platen 76 defined by the engagement of the carriage 80 with an adjustable stop member 86 mounted on the frame 58, and the second position of the platen 76 defined (as will later be explained) when the carriage 80 contacts a microswitch 87 mounted on the frame 58.

Figure 5:
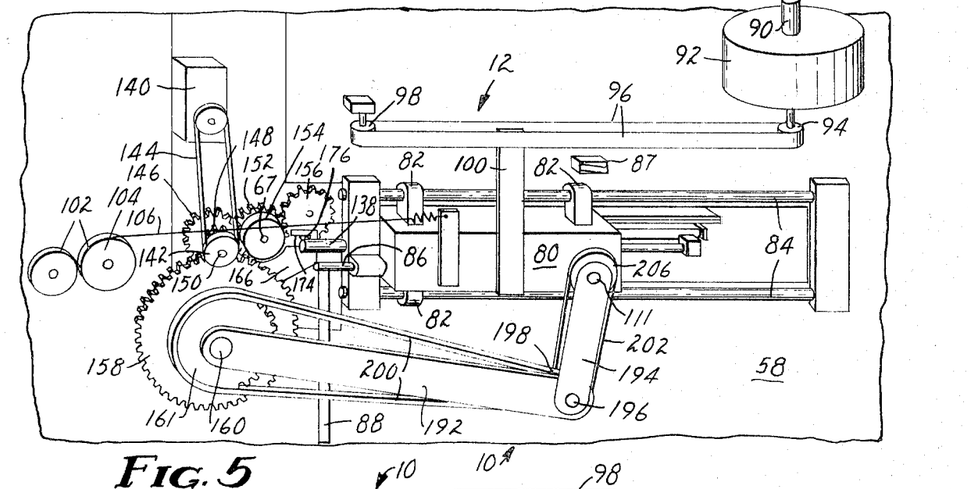
FIG. 5 is a perspective view showing the bottom, front and left side of the drive for the card handling mechanism.

The stop member 86 is slidably mounted for limited movement in a direction parallel to the movement of the carriage 80 via an adjusting lever 88 engageable with detents 89 on the frame 58. The position of the stop member 86 is adjustable in incremental steps to vary the first position of the carriage 80 between a position affording full width scanning of the microfilm insert carried by an aperture card 14 and positions affording more limited scanning of the microfilm in an aperture card on the platen 76. This limited scanning may be advantageous where it is desired to print only a portion of the microfilm.

Movement of the platen 76 from its first to its second position is afforded by moving means including a drive shaft 90 coupled to the drum 20 of the printing mechanism for timed rotation therewith. The drive shaft 90 is coupled through an electric clutch 92 to a pulley 94 driving a belt 96 tensioned between the pulley 94 and an idler pulley 98 rotatably mounted on the frame 58. The drive belt 96 is attached at one point to a bar 100 attached to the carriage 80 on which the platen 76 is mounted. When a print of a microfilm in an aperture card 14 positioned on the platen 76 is to be made, control means for the machine 10 (later to be explained) energize the electric clutch 92 for a predetermined portion of the printing cycle to move the carriage 80 from its first position to its second position in synchronization with the rotation of the drum 20. Engagement of the microswitch 87 by the bar 100 on the carriage 80 in the second position of the carriage 80 will de-energize the electric clutch 92. Subsequent return of the carriage 80 to its first position is afforded by biasing means illustrated as a negator spring 102 supplying constant torque to a pulley 104 in a direction for winding on a length of cord 106 extending between the pulley 104 and the carriage 80.

A clamping plate 108 is mounted on the carriage 80 for movement between a release position spaced from the platen 76 and a clamping position adjacent the platen 76 for clamping an aperture card to the platen 76 when the aperture card is in the predetermined position. The drive means moves the clamping plate to the release position during operation of the feeding mechanism 50 to afford movement of an aperture card along the platen 76 between the rollers 110 and 112, and into engagement with a gate member 114 at the predetermined position along the platen 76. The gate member 114 is mounted on the carriage 80 for movement by the drive mechanism between a blocking position interrupting movement of an aperture card along the platen at the predetermined position, and an open position which allows an aperture card to be ejected from the platen by the drive means when the clamping plate 108 is in the release position.

Referring now to FIGS. 3 and 4, the clamping plate 108 is a rectangular transparent glass plate mounted on the carriage 80 by a hinge 116 for movement between its clamping and release positions position with the adjacent surface of the clamping plate 108 generally parallel with the supporting surface 78 of the platen 76 and spaced approximately the thickness of an aperture card 14 therefrom, and the release position to which the clamping plate 108 may be pivoted about the hinge 116 affording movement of a microfilm card between the platen 76 and the clamping plate. A biasing means or pair of L-shaped flat springs 118 mounted on the carriage 80 are provided for biasing the clamping plate 108 to the clamping position.

A horizontally extending plate-like arm 120 is attached to the clamping plate 108 and is slidably positioned in a slot 122 formed in an enlarged hook-like end 124 of an L-shaped arm 126 on a shaft 128 pivotably mounted on the frame 58. The arm 126 is pivotable from a first position to which the arm 126 is urged by a spring 130 positioned between the end 124 and the frame 58 affording positioning of the clamping plate 108 in its clamping position, and a second position at which the end 124 engaged with the arm 120 positions the clamping plate 108 in its release position. The arm 120 is sufficiently long that engagement between the end 124 and the arm 120 will be maintained in the various possible first positions of the carriage 80 established by various positionings of the adjustable stop member 86.

The clamping means also includes means affording manual operation thereof between its clamping and its release position to afford manual insertion, or removal of an aperture card 14.

A vertically extending arm 132 is attached to the plate 108 and may be manually manipulated to afford movement of the plate 108 to the release position and manual removal or insertion of a card between the clamping plate 108 and the platen 76. The slot 122 in the arm 126 is sufficiently wide to afford manual movement of the plate 108 to its release position without corresponding movement of the arm 126 to its second position.

The portion of the drive means on the carriage 80 includes the idler roller 112, and the roller 110 on a shaft 111 driven by the drive means in a manner later to be explained. The nip between the rollers 110 and 112 defines a portion of the path on the carriage 80. The roller 112 is mounted on the carriage 80 for movement at right angles to its axis and to the axis of the roller 110 from a position with the peripheries of the rollers 110 and 112 in contact, to a position with the peripheries of the rollers 110 and 112 separated more than the thickness of an aperture card 14. The roller 112 is spring biased toward the roller 110 to afford frictional driving engagement between the roller 110 and an aperture card 12 fed along the path by the feeding means 50 to move the aperture card 14 between a pair of guide plates 134 and into contact with the gate member 114 when the gate member 114 is in its blocking position. The spring pressure and the frictional coefficient between the roller 110 and an aperture card 14 are selected so that upon continued rotation of the roller 110 after the aperture card 14 abuts the gate member 114, the roller 110 will slip on the aperture card 14 without damage thereto.

The guide plates 134 are formed with converging flanges 135 along the edges adjacent the rollers 110 and 112 to guide the driven aperture cards between the plates 134, and along their upper edges opposite the carriage 80 to guide an aperture card 14 manually inserted between the clamping plate 108 and the platen 76. Additionally, each of the rollers 110 and 112 is formed with a beveled surface 137 from its surface opposite the carriage 80 to its peripheral surface to guide such a manually inserted aperture card into the nip between the rollers 110 and 112.

The shaft 111 upon which the driven roller 110 is mounted is mounted in a plane parallel to the plane of movement of a card 14 and inclined in a direction of movement of the card to a line perpendicular to the path to impart a component of driving force to a driven aperture card 14 toward the carriage 80 to insure positioning of the edge of the aperture card 14 against the base surface of the carriage 80. Thus, with one edge of the aperture card 14 positioned against the carriage 80 and another against the gate member 114, the aperture card 14 is accurately positioned on the carriage 80 and will position the microfilm carried thereon in a predetermined position along the platen 76.

The gate member 114 is rotatably mounted on the carriage 80 for rotational movement in a plane at right angles to the path between its blocking position across the path adjacent one end of the guide plates 134 as shown in FIGS. 3 and 4 and its non-blocking position affording ejection of an aperture card 14 from the platen 76. The gate member 114 has an arm 139 formed with a slot extending in the direction of movement of the carriage 80. A toggle arm 141 projects from a shaft 138 rotatably mounted on the frame 58 in axial alignment with the rods 84. The toggle arm 141 slidably engages the slot in the arm 139 in any of the positions of the carriage 80. Rotation of the shaft 138 by the drive means as will later be explained rotates the gate member 114 via the toggle arm 141 between its blocking and non-blocking positions.

The drive means will operate the feeding means 50 to feed an aperture card to the projector station 11, and will simultaneously eject any aperture card previously positioned at the projection station 11. The drive means moves the clamping plate 108 to its non-clamping position and the gate member 114 to the non-blocking position to afford movement of an aperture card 14 through the projection station 11, and drives the roller 110 to eject any aperture card 14 previously positioned on the platen 76 to the stacking means while simultaneously operating the feeding means 50 to feed a new aperture card 14 to the projection station 11. The drive means then sequentially moves the gate member 114 to the blocking position to halt movement of the new aperture card 14 in a predetermined position along the platen 76, moves the clamping plate 108 to its clamping position, and deactivates itself.

Additionally, the drive means limits rotation of the drive roller 66 to prevent successive feeding of aperture cards 14 from the pack 52, while continuing rotation of the driven rollers 72 and 110 for a longer period to propel the new aperture card 14 to the projection station 11.

Figure 6:
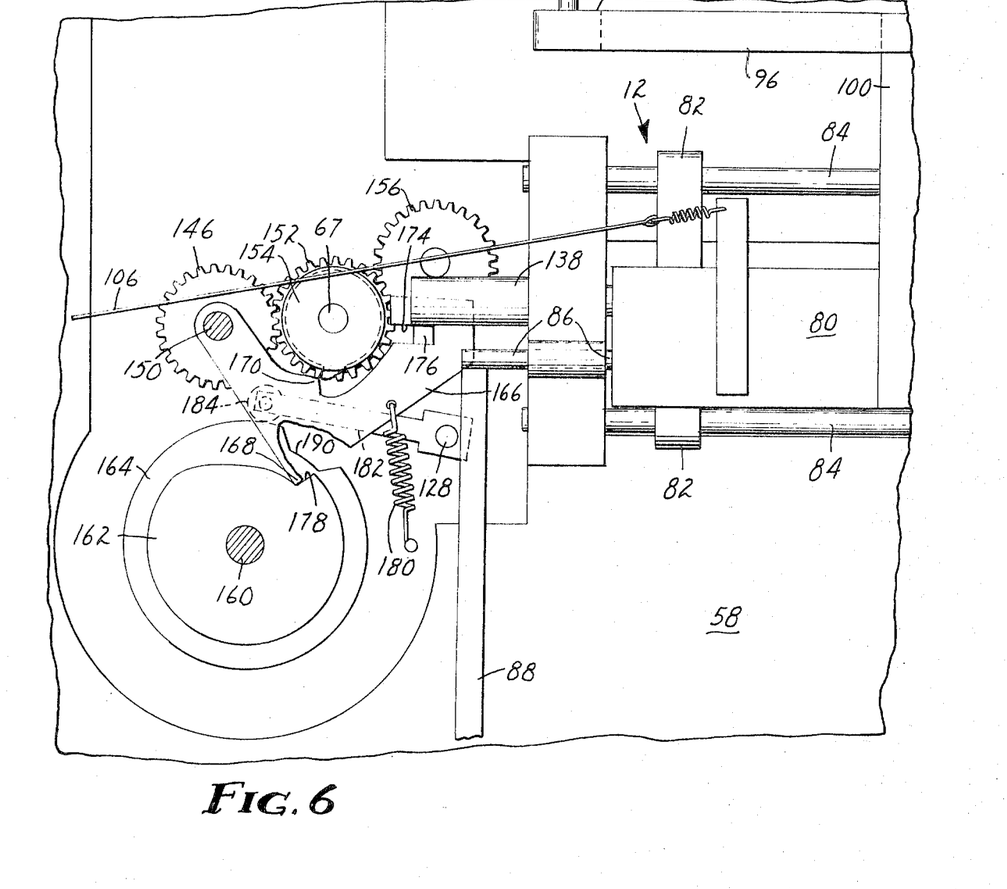
FIG. 6 is a fragmentary view partially in section of the drive shown in FIG. 5 with parts removed to show details.

Referring now to FIGS. 3, 5 and 6, a drive motor 140 is coupled by a timing belt 144 to a pulley 142, a gear 146, and a gear 148 all fixably mounted on a shaft 150. The gear 146 is in driving engagement with a gear 152 coupled by a friction clutch 154 to the shaft 67 mounting the drive roller 66. The gear 152 is in driving engagement with a gear 156 which drives the driven roller 72. The gear 148 is in engagement with a large gear 158 fixed to a shaft 160, on which shaft 160 are fixably mounted a sprocket 161, a first cam 162 (FIG. 6) and a second larger cam 164.

A follower arm 182 having a follower roller 184 in engagement with the peripheral surface of the cam 164 is fixably mounted on the shaft 128 which rotatably mounts the L-shaped arm 126 for moving the clamping plate 108 from its clamping to its release position. Also mounted on the shaft 128 is an arm 186 (FIG. 3) adapted for engaging and closing a normally open microswitch 188 which when closed will connect the motor 140 to a source of electrical power. When the follower arm 182 is in a second position with the follower roller 184 on the circular major portion of the periphery of the cam 164, the L-shaped arm 126 is in its second position, thereby positioning the clamping plate 108 in the release position, and the arm 186 maintains the microswitch closed thereby energizing the motor 140. In a first position of the follower arm 182 to which it is urged by the spring 130 when the roller 184 engages a detent 190 on the cam 164, the L-shaped arm 126 is positioned in its first position allowing the clamping plate 108 to assume its clamping position under the influence of the springs 118, and the arm 186 is out of engagement with the microswitch 188, thus de-energizing the motor 140.

Mounted on the shaft 150 for pivotal movement between a first and a second position is a follower arm 166 having a corner 168 in engagement with the peripheral surface of a cam 162, a projection 170 formed for engagement with the portion of the friction clutch 154 attached to the shaft 67, and a slot 174 engaged with a toggle arm 176 extending from the shaft 138 operably connected to the gate member 114. The follower arm 166 will assume its second position when the cam 162 is rotated so that the corner 168 on the follower arm 166 moves into a notch 178 under the influence of a spring 180. In the second position (shown in FIG. 6) the projection 170 is separated from the friction clutch 154 allowing rotation of the drive roller 66 with the gear 152, and the gate member 114 is rotated to its non-blocking position. In the first position of the follower arm 166 with the corner 168 on the circular portion of the cam 162, the projection 170 is in engagement with the friction clutch 154 thereby preventing rotation of the drive roller 66 with the gear 152, and the gate member 114 is moved to its blocking position.

The drive means is also coupled between the drive motor 140 and the driven roller 110 mounted on the carriage 80. First and second support arms 192 and 194, each have one end rotatably mounted upon a shaft 196 supporting a double sprocket 198, with the opposite end of the arm 192 pivotally mounted on the shaft 160, and the opposite end of the arm 194 pivotally mounted on the shaft 111. Two chains 200 and 202 provide driving contact between the sprocket 161 and a sprocket 206 on the shaft 111 via the double sprocket 198. The arms 192 and 194 pivot about the shafts 160, 111, and 196 to afford movement of the carriage 80.

The operation of the drive means will now be explained for feeding a new aperture card to the projection station 11, and simultaneously ejecting an aperture card 14 previously positioned on the platen 76. Initially the cam 164 is oriented with the follower roller 184 in the detent 190 so that the arm 182 is in its first position. Thus the arm 186 is out of engagement with the normally open microswitch 188 so that the source of power to the motor 140 through the microswitch 188 is disconnected, and the arm 126 is positioned to allow the clamping plate 108 to assume its clamping position. The cam 162 is initially oriented with the follower arm 166 contacting the circular peripheral segment of the cam 162 closely adjacent the notch 178. Thus, the gate member 114 is rotated to its blocking position, and the projection 170 is engaged with the friction clutch 154 to block rotation of the drive roller 66. To activate the drive means, the motor 140 is momentarily energized by the control means for the machine 10. Operation of the motor 140 causes rotation of the cams 162 and 164 and the driven rollers 72 and 110, however, initially the roller 110 slips against the aperture card at the projection station 11 which aperture card 14 is clamped to the platen 76 by the clamping plate 108, and blocked from movement along the path by the gate member 114, and the roller 66 does not rotate to feed a new aperture card from the pack 52 to the driven roller 72. Slight rotation of the cam 164 by the motor 140 moves the roller 184 out of the detent 190 and the follower arm 182 to its second position with the roller 184 on a circular segment of the cam 164, thereby rotating the arm 126 to move the clamping plate 108 to its release position to allow movement of an aperture card 14 between the platen 76 and the clamping plate 108, and closing the microswitch 188 to supply power to the motor 140 independent of the control means. Shortly after movement of the arm 182 to its second position, the cam 162 is positioned to allow the corner 168 of the follower arm 166 to move into the notch 178, thereby moving the gate member 114 to its non-blocking position to allow the driven roller 110 to eject an aperture card 14 from the projection station 11, and removing the projection 170 from the friction clutch 154 to allow rotation of the driven roller 66 to drive an aperture card 14 from the pack 52 to the driven roller 72. The subsequent 90° rotation of the cam 162 moves the follower arm 166 back to its first position with the corner 168 on the circular segment of the cam 162, thereby again engaging the projection 170 with the friction clutch 154 to prevent further rotation of the drive roller 66 and prevent the feeding of more than one card from the pack 52. The cam 164 maintains the arm 182 in its second position during approximately one revolution of the cams 162 and 164, thus providing operation of the drive motor 140 for a sufficient time to complete driving a new aperture card 14 to the platen 76 while maintaining the clamping plate 108 in the release position. When the cam 164 has completed one revolution the follower roller 184 drops into the detent 190 and the arms 186 and 126 will be simultaneously moved, thereby opening the microswitch 188 to discontinue power flow to the motor 140 and allowing the clamping plate 108 to assume the clamping position to clamp the new aperture card 14 against the platen 76 at the projection station 11.

The stacking means 54 for stacking microfilm aperture cards 14 ejected from the projector station 11 includes a drum 208 around which the aperture cards 14 are driven to a try 220. The drum 208 has a large diameter (preferably above 4 inches) to prevent excessive curving of the aperture cards 14. The drum 208 includes axially spaced radially extending flanges 210 formed of compressible foam rubber strips and is rotatably mounted on the frame 58 with the periphery of the flanges 210 generally tangent with the plane of the path through the projection station 11. The flanges 210 are positioned on the drum 208 to contact an aperture card 14 with the microfilm carried on the aperture card positioned between the flanges 210.

A guide means or curved guide plate 212 having a guide lip 214 adjacent an inlet end 213 extends approximately 180° around the periphery of the drum 208 to a discharge end 215 and affords means for pressing an aperture card 14 fed between the plate 212 and the drum 208 at the inlet end 213 into frictional driving contact with the flanges 210 to drive the aperture card 14 out of the discharge end 213 and into the tray 220. The guide plate 212 is attached to the frame 50 only at an extension 217 from the discharge end 215, and is biased by a spring 219 toward the drum 208 to afford frictional driving contact between the flanges 210 and an aperture card 14 under the guide plate 212. It has been found that even when the guide plate 212 is not relieved to avoid contact with the microfilm on an aperture card 14, damage to the microfilm is generally not a problem. Apparently as an aperture card 14 is curved when passing the drum 208, the microfilm dishes into the space between the flanges 210, thereby restricting potentially damaging contact between the microfilm and the guide plate 212.

A motor 216 is in driving engagement with the drum 208 via a belt and pulley assembly 218. The motor 216 is electrically connected to be activated and deactivated with the motor 140, thereby maintaining the stacking means 54 in readiness to stack an aperture card 14 ejected from the projection station 11.

The stacking means drives an aperture card from the discharge end 215 of the guide plate 212 and stacks the aperture card 14 in a vertical position on the tray 220. An arm 222 is pivotally mounted on the drive shaft for the drum 208 and rotatably supports an idler pulley 223, and a pulley 224 at its distal end. An O-ring drive belt 225 extends around the pulleys 223 and 224 and a groove 228 around the drum 208 between the flanges 210. A spring 226 is provided to bias the arm 222 toward engagement between a portion of the belt 225 on the pulley 224 and the tray 220. The arm 222 spaces the pulley 224 from the drum 208 so that aperture cards 14 discharged from the discharge end 215 of the guide plate 212 will be driven under the belt 225 on the pulley 224 and thereby across the tray 220 or stack of aperture cards in the tray 220 into engagement with an end wall 227.

Each aperture card 14 successively stacked on the tray 220 will cause clockwise rotation of the arm 222 against the bias of the spring 225 to accommodate the growing stack of aperture cards 14 on the tray 220.

The belt 225 affords a high frictional driving force against an aperture card 14 under the biasing force of the spring 226. The belt 225 is loosely tensioned around the drum 208 and pulleys 223 and 224 so that after a card discharged from the guide plate 212 is driven by the belt 225 into contact with the end wall 227, the belt 225 will stop and will not be driven by the drum 208 while the dynamic friction between the belt 225 and the groove 228 is transferred through the belt 225 to press the contacted aperture card against the wall 227. Thus the contacted aperture card 14 will not be damaged by relative movement of the belt 225.

The microfilm print-out machine 10 includes control means (not shown) for controlling the operation of the aperture card handling mechanism 12 in one of a number of operational modes manually actuatable at a control counsel for the machine 10. The operational modes may include an automatic mode for printing a preselected number of prints (1 or more) of the microfilm in each aperture card 14 in a pack 52 of aperture cards automatically fed seriatim through the machine 10 by the card handling mechanism 12. In the automatic operational mode, the control means actuates the printing mechanism for repetitive operation of its printing cycle, and actuates the motor 140 of the drive means after a predetermined number of printing cycles (as may be signaled to a counting means via a microswitch upon movement of sheets along the conveyor 32) to change the aperture card at the projection station 11 during a non-scanning portion of a printing cycle.

The operational modes may also include a manual mode affording operation of the printing mechanism for a predetermined number of printing cycles without operation of the feeding means 50. This mode may be desirable for interrupting a long printing sequence in the automatic mode so that a particular aperture card may be manually positioned at the projection station and prints made thereof.

Additionally, the control means may afford operation of the drive means to change the aperture cards 14 at the projection station 11 without operation of the printing cycle for the machine 10 to produce a print.

Having thus described the present invention, what is claimed is:

1. A mechanism for handling microfilm aperture cards in a microfilm print-out machine requiring scan exposure of the microfilm by moving the microfilm at a predetermined rate through the light path of an optical projection station, said mechanism comprising:

a platen at the projection station having a supporting surface and being mounted for movement between a first and a second position with the supporting surface oriented at a right angle to the light path;

means for moving the platen from said first position to said second position at said predetermined rate;

means for feeding aperture cards seriatim to said platen from a plurality of microfilm aperture cards stored on said mechanism;

means for positioning a microfilm aperture card fed to said platen by said feeding means in a predetermined position along said supporting surface with its microfilm positioned to traverse the light path upon movement of the platen from its first position to its second position;

means for ejecting an aperture card from said platen;

means for clamping an aperture card against said platen, said clamping means comprising:

a clamping plate;

means mounting said clamping plate for movement relative to the platen between a release position to afford movement of an aperture card between the clamping plate and the platen and a clamping position for clamping a single aperture card to said platen; and means for biasing the clamping plate to the clamping position; and a drive mechanism operably coupled between said feeding means, positioning means, clamping means and ejection means for operating said feeding means and ejection means, for moving the clamping plate to its release position during feeding of an aperture card to the platen by said feeding means and ejection of an aperture card from said platen by said ejection means, and for affording movement of the clamping plate to its clamping position under the influence of said biasing means upon positioning of said aperture card along said supporting surface by said positioning means, said drive mechanism including an arm adapted to engage said clamping means and being mounted for movement between a first position affording movement of said clamping plate between its clamping and release positions independent of said drive mechanism and a second position engaged with said clamping means to position said clamping plate in its release position against the bias of said biasing means, said clamping means being adapted for manual engagement to afford manual movement of said clamping plate to said release position against the bias of said biasing means when said arm is in said first position to afford manual insertion or removal of an aperture card on the platen.

2. A mechanism according to claim 1, wherein said feeding means feeds aperture cards to the platen in a first direction in the plane of said supporting surface; said mounting means includes a hinge mounting the clamping plate for pivotal movement between its clamping and release positions, the clamping means includes a lever adapted for manual engagement to pivot said clamping plate to its release position against said biasing means, and the edges of said platen and clamping plate are adapted to afford manual insertion and removal of an aperture card in a direction normal to said first direction when said clamping plate is in its release position.

3. A mechanism according to claim 1, wherein said feeding means feeds aperture cards to the platen along a path in the plane of said supporting surface; said positioning means includes a gate movable between a blocking position across said path and a non-blocking position spaced from said path, said gate being moved by said drive mechanism to said blocking position to contact the leading edge of an aperture card moving along said path during the operation of said feeding means, and to said non-blocking position during operation of said ejection means.

4. A mechanism for handling microfilm aperture cards in a microfilm print-out machine requiring scan exposure of the microfilm by moving the microfilm at a predetermined rate through the light path of an optical projection station, said mechanism comprising:

a platen at the projection station having a supporting surface and being mounted for movement between a first and a second position with the supporting surface oriented at a right angle to the light path;

means for moving the platen from said first position to said second position at said predetermined rate;

means for feeding aperture cards seriatim to said platen from a plurality of microfilm aperture cards stored on said mechanism; means for positioning a microfilm aperture card fed to said platen by said feeding means in a predetermined position along said supporting surface with its microfilm positioned to traverse the light path upon movement of the platen from its first position to its second position;

ejection means for ejecting an aperture card from said platen;

means for clamping an aperture card against said platen, said clamping means comprising:

a clamping plate;

means mounting the clamping plate on the platen for movement between a release position to afford movement of an aperture card between the clamping plate and the platen and a clamping position for clamping a single aperture card to said platen; and means for biasing the clamping plate to the clamping position;

a drive mechanism operably coupled between said feeding means, positioning means, clamping means and ejection means for operating said feeding means and ejection means, for moving the clamping plate to its release position during feeding of an aperture card to the platen by said feeding means and ejection of an aperture card from said platen by said ejection means, and for affording movement of the clamping plate to its clamping position under the influence of said biasing means upon positioning of said aperture card along said supporting surface by said positioning means, said drive mechanism including an arm adapted to engage the clamping means and being mounted for movement between a first position affording movement of the clamping plate between its clamping and release positions independent of said drive mechanism, and a second position engaged with said clamping means to position said clamping plate in its release position against the bias of said biasing means, said clamping means being adapted for manual engagement to afford manual movement of said clamping plate to said release position against the bias of said biasing means when said arm is in said first position to afford manual insertion or removal of an aperture card on the platen; and means for stacking aperture cards ejected by said ejection means, said stacking means comprising:

a rotatably mounted drum, said drum having a periphery aligned and positioned to receive a card ejected by said ejection means;

means for driving said drum in a first rotational direction to drive a microfilm card away from said ejection means;

means for pressing a card ejected by said ejection means into driving engagement with said drum;

an arm having a first end mounted for pivotal motion about the axis of said drum, and a second end projecting beyond the periphery of said drum;

a pulley rotatably mounted on the second end of said arm;

a belt extending around said pulley and drum, and being adapted to frictionally engage an aperture card said belt is pressed against;

a stacking tray including a generally planar stacking surface positioned to afford contact by the belt on said pulley, and an end wall intersecting and positioned along said stacking wall in a direction toward which the portion of said belt adjacent said stacking surface is driven; and means biasing said arm for rotation toward said stacking wall;

said belt being tensioned around said pulley and drum to stop the movement of the belt and afford relative movement between said belt and said drum when a said aperture card contacted by the portion of said belt on said pulley abuts said end wall.

5. A mechanism according to claim 4, wherein said feeding means feeds aperture cards to the platen in a first direction in the plane of said supporting surface, said mounting means includes a hinge mounting the clamping plate for pivotal movement about an axis, said clamping means includes a lever adapted for manual engagement to pivot said clamping plate to its release position against said biasing means, and the edges of said platen and clamping plate are adapted to afford manual insertion and removal of an aperture card in a direction normal to said first direction when said clamping plate is in its release position.

6. A mechanism according to claim 4, wherein said feeding means feeds aperture cards to the platen along a path in a first direction in the plane of said supporting surface; said positioning means includes a gate movable in a plane normal to said first direction between a blocking position across said path and a non-blocking position spaced from said path, said gate being moved by said drive means to said blocking position to contact the leading edge of an aperture card moving along said path during the operation of said feeding means, and to said non-blocking position during operation of said ejection means.

* * * * *